(12) United States Patent
Inagaki

(10) Patent No.: US 9,626,433 B2
(45) Date of Patent: Apr. 18, 2017

(54) SUPPORTING ACQUISITION OF INFORMATION

(71) Applicant: INTERNATIONAL BUSINESS MACHINES CORPORATION, Armonk, NY (US)

(72) Inventor: Takeshi Inagaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 14/246,404

(22) Filed: Apr. 7, 2014

(65) Prior Publication Data

US 2014/0317121 A1  Oct. 23, 2014

(30) Foreign Application Priority Data

Apr. 23, 2013 (JP) ................................ 2013-090022

(51) Int. Cl.
  *G06F 17/30* (2006.01)
(52) U.S. Cl.
  CPC .............................. *G06F 17/30707* (2013.01)
(58) Field of Classification Search
  CPC combination set(s) only.
  See application file for complete search history.

(56) References Cited

U.S. PATENT DOCUMENTS

| 7,493,252 | B1 | 2/2009 | Nagano et al. |
| 2011/0040764 | A1* | 2/2011 | Duchon ................ G06Q 10/04 707/738 |
| 2013/0212110 | A1* | 8/2013 | Stankiewicz ...... G06Q 30/0631 707/740 |

FOREIGN PATENT DOCUMENTS

| JP | 2001-075966 | 3/2001 |
| JP | 2004030202 | 1/2004 |
| JP | 2005-018689 | 1/2005 |
| JP | 2005235065 | 9/2005 |
| JP | 2006-301959 | 2/2006 |
| JP | 2007079948 | 3/2007 |
| JP | 2010-267141 | 11/2010 |
| JP | 2012221316 | 11/2012 |

* cited by examiner

*Primary Examiner* — Shyue Jiunn Hwa
(74) *Attorney, Agent, or Firm* — Law Office of Jim Boice

(57) ABSTRACT

An apparatus supports acquisition of information from a document including a plurality of words. An acquisition hardware unit acquires first information that shows a degree to which the document belongs to each of a plurality of clusters based on a concept included in the document. Second information shows a degree to which a single word among the plurality of words appears in each of the plurality of clusters based on a concept of the single word. A generation hardware unit, based on the first and second information, generates third information that shows a degree of overlap between the concept included in the document and the concept of the single word. A determination hardware unit determines whether or not the third information shows a degree of overlap that is lower than a predetermined criterion, and an output hardware unit outputs a result of this determination.

9 Claims, 8 Drawing Sheets

| DOCUMENT ID | DOCUMENT |
|---|---|
| Doc1 | IBM MAKES ANNOUNCEMENT OF NEW LARGE-SCALE SERVER ON FEBRUARY 1 |
| Doc2 | IBM RESEARCH DISCLOSES NEXT-GENERATION SEMICONDUCTOR TECHNOLOGY AS STUDY RESULTS |
| Doc3 | IBM RELEASES NEW VERSION OF DATABASE SOFTWARE |
| Doc4 | IBM GIVES CONSIDERATION TO IT APPLICATION IN AGRICULTURE FIELD |
| Doc5 | IBM MAKES ANNOUNCEMENT OF CONSOLIDATED ACCOUNTS FOR 2012 |

FIG. 4

| DOCUMENT ID | WORD |
|---|---|
| Doc1 | IBM, LARGE-SCALE, SERVER, ANNOUNCEMENT |
| Doc2 | IBM, RESEARCH, STUDY, RESULTS, NEXT-GENERATION, SEMICONDUCTOR, TECHNOLOGY, DISCLOSES |
| Doc3 | IBM, DATABASE, SOFTWARE, VERSION, RELEASES |
| Doc4 | IBM, AGRICULTURE, FIELD, IT, APPLICATION, CONSIDERATION |
| Doc5 | IBM, CONSOLIDATED, ACCOUNTS, ANNOUNCEMENT |

FIG. 5

| DOCUMENT ID | p(C;D) ||
| --- | --- | --- |
| | C=IBM | C = AGRICULTURE |
| Doc1 | 1.0 | 0.0 |
| Doc2 | 1.0 | 0.0 |
| Doc3 | 1.0 | 0.0 |
| Doc4 | 0.7 | 0.3 |
| Doc5 | 0.9 | 0.1 |

FIG. 6

| WORD | p(W;C) | |
|---|---|---|
| | C=IBM | C = AGRICULTURE |
| I B M | 1.0 | 0.0 |
| SERVER | 1.0 | 0.0 |
| SEMICONDUCTOR | 1.0 | 0.0 |
| DATABASE | 1.0 | 0.0 |
| AGRICULTURE | 0.0 | 1.0 |
| I T | 1.0 | 0.0 |
| ACCOUNTS | 0.8 | 0.2 |
| ⋮ | ⋮ | ⋮ |

FIG. 7

SUPPORTING ACQUISITION OF INFORMATION

BACKGROUND

The present invention relates to an apparatus and a method for supporting acquisition of information. In particular, the present invention relates to an apparatus and a method for supporting acquisition of information from a document including a plurality of words.

In recent years, accompanying increases in the capacities of storage media and the like, large amounts of document data (hereunder, referred to simply as "documents") are being accumulated in computer systems. Therefore, various kinds of technology for obtaining characteristic concepts or novel opinions and the like have been proposed to effectively utilize such large amounts of accumulated documents.

One such technology uses technology in which: a clustering control unit executes document clustering processing or word clustering processing with respect to a document set consisting of documents designated by a user from among a plurality of documents; a category classification method setting unit sets, in a category storage unit, methods of classifying categories into which subsets among the document set generated by the clustering processing are classified; an automatic classification control unit determines a classification destination candidate category set and a classification target document set in accordance with a user operation, and based on the classification method of each category of a classification destination candidate category set that is set in the category storage unit, controls rule-based automatic classification processing and case-based automatic classification processing with respect to the classification destination candidate category set and the classification target document set.

Another known method and a system captures useful knowledge by extracting a concept having a unique characteristic from a large amount of data including documents, in which: a concept extracting apparatus extracts concepts by category from data including document data; and a characteristic concept extracting apparatus extracts characteristic concepts from among the extracted concepts, and with respect to the concepts in separate categories, from among concepts that belong to the same category, extracts a concept for which a proportion occupied by the concept among concepts belonging to a corresponding other category exceeds a preset value.

Another known technology utilizes a document processing apparatus that includes: a characterization unit for determining characteristic data for each of a plurality of items of document data; a clustering unit for, based on the characteristic data determined by the characterization unit, clustering the plurality of items of document data into a plurality of clusters that are each a set of similar items of document data; and an extraction unit for extracting a cluster that does not reach a predetermined level of similarity from the plurality of clusters obtained by the clustering unit.

Another known technology pre-associates a plurality of data sets with each other, and for each data item included in the data sets, obtains a specificity index having a correlation with respect to a data item being far apart in value from other data items and the frequency of the data item being small, compares the specificity index with a predetermined reference index, and selects a plurality of data items based on the comparison results and performs data mining utilizing the selected data items.

SUMMARY

In one embodiment of the present invention, an apparatus for supporting acquisition of information from a document including a plurality of words comprises: an acquisition hardware unit for acquiring first information that shows a degree to which the document belongs to each of a plurality of clusters based on a concept included in the document, and second information that shows a degree to which a single word among the plurality of words appears in each of the plurality of clusters based on a concept of the single word; a generation hardware unit for, based on the first information and the second information, generating third information that shows a degree of overlap between the concept included in the document and the concept of the single word; a determination hardware unit for determining whether or not the third information shows a degree of overlap that is lower than a predetermined criterion; and an output hardware unit for, in response to determining that the third information shows a degree of overlap that is lower than the criterion, outputting information indicating that the single word is a unique word in the document.

In one embodiment of the present invention, a method and/or computer program product for supporting acquisition of information from a document including a plurality of words comprises: acquiring first information that shows a degree to which the document belongs to each of a plurality of clusters based on a concept included in the document, and second information that shows a degree to which a single word among the plurality of words appears in each of the plurality of clusters based on a concept of the single word; generating third information that shows a degree of overlap between the concept included in the document and the concept of the single word, based on the first information and the second information; determining whether or not the third information shows a degree of overlap that is lower than a predetermined criterion; and outputting information indicating that the single word is a unique word in the document in response to determining that the third information shows a degree of overlap that is lower than the criterion.

BRIEF DESCRIPTION OF THE SEVERAL VIEWS OF THE DRAWINGS

FIG. 4 is a view illustrating an example of documents to be analyzed that are used by the document analysis apparatus according to the embodiment of the present invention;

FIG. 5 is a view illustrating an example of a word list generated by the document analysis apparatus according to the embodiment of the present invention;

FIG. 6 is a view illustrating an example of probabilities p(C;D) that are stored by the document analysis apparatus according to the embodiment of the present invention;

FIG. 7 is a view illustrating an example of probabilities p(W;C) that are stored by the document analysis apparatus according to the embodiment of the present invention.

DETAILED DESCRIPTION

Figure 1:
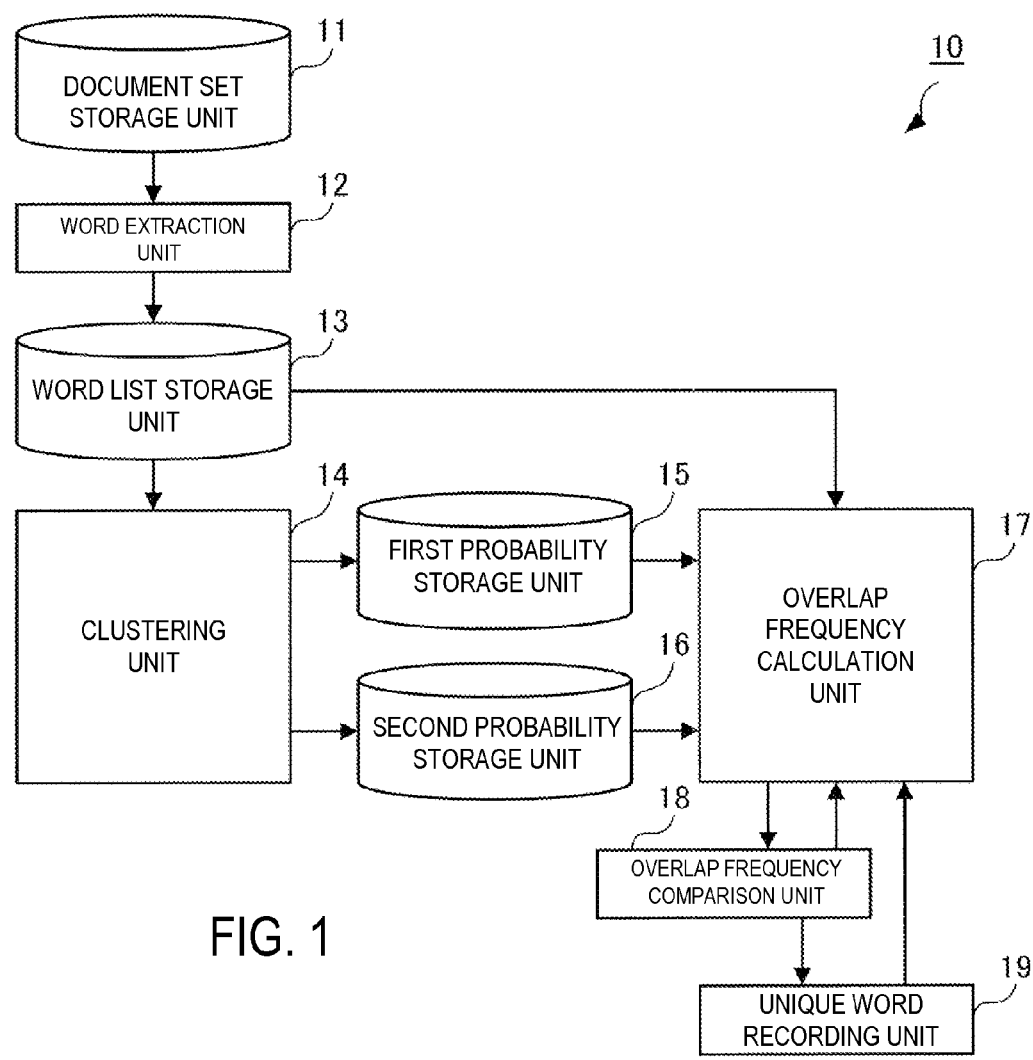
FIG. 1 is a block diagram illustrating a configuration example of a document analysis apparatus according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of the present invention is described in detail herein with reference to the accompanying drawings.

First, an outline of the operations of the present embodiment will be described. The present embodiment extracts an underlying concept behind a word, and based thereon finds a document in which the word is being used in a unique way that deviates from a common context.

To achieve this, according to the present embodiment, first, a document set that includes documents to be analyzed is classified using clustering technology. For example, LDA (Latent Dirichlet Allocation) may be used as the clustering technology. Clustering based on LDA is performed with respect to a document set including documents to be analyzed based on the assumption that, after extracting words from the respective documents to be analyzed, the appearance of the word in the relevant document is due to a concept that is included in the document.

As a result, a probability that a certain document includes a certain concept, and a probability that a certain word appears in a certain concept are obtained. Of these, the former probability can be said to be the probability that a document D belongs to a cluster C that is based on a concept that is included in the document. Hereunder this probability is represented by $p(C;D)$. Further, the latter probability can be said to be the probability that a word W appears in the cluster C that is based on the concept. Hereunder, this probability is represented by $p(W;C)$.

Finally, using the probability $p(C;D)$ and the probability $p(W;C)$, a concept (cluster to which the document belongs) included in a document is determined, a word that is a difficult word to appear with respect to the concept (a word that is a difficult word to appear in the cluster) is identified, and the word is taken as a word that is unique (unique word) in that document.

Note that although the term "word" is used in the present specification, this term does not refer to only a grammatical "word". For example, as used herein the term "word" is also assumed to include a phrase in which words are combined and the like.

Next, a document analysis apparatus that performs the operations outlined above is described.

FIG. 1 is a block diagram that illustrates an example of the functional configuration of a document analysis apparatus 10 according to the present embodiment. As shown in the figure, the document analysis apparatus 10 includes a document set storage unit 11, a word extraction unit 12, and a word list storage unit 13. The document analysis apparatus 10 also includes a clustering unit 14, a first probability storage unit 15, and a second probability storage unit 16. In addition, the document analysis apparatus 10 includes an overlap frequency calculation unit 17, an overlap frequency comparison unit 18, and a unique word recording unit 19.

The document set storage unit 11 stores a document set that includes documents to be analyzed.

The word extraction unit 12 extracts words from each document to be analyzed included in the document set that is stored in the document set storage unit 11, and generates a word list in which each document and words extracted from each document are associated with each other. According to the present embodiment, the word extraction unit 12 is provided as an example of an extraction unit for extracting words from each document of a plurality of documents.

In this case, when extracting words, the word extraction unit 12 may perform any of the following first to fourth filtering processing as filtering processing that excludes unwanted words. The first filtering processing is processing that checks the appearance frequency of each word in a document set, and excludes a word for which the appearance frequency is greater than or equal to a threshold value (for example, 20%) or, conversely, a word with an extremely small appearance frequency that is less than or equal to a threshold value. The second filtering processing is processing that excludes a word for which a probability of appearing in a cluster is equal to or less than a threshold value with respect to all clusters, that is, a word that can be regarded as not belonging to any cluster. The third filtering processing is processing that excludes a word for which a probability of appearing in a cluster is equal to or greater than a threshold value with respect to a plurality of clusters. The fourth filtering processing is processing that excludes a word that satisfies a condition. The condition is a condition that relates to the word class, and if it is assumed that the condition is that the word class is other than a noun, this processing is processing that leaves only nouns.

Note that a configuration may be adopted in which a threshold value or a condition that is used in these filtering processing operations is taken as a parameter, and the parameter can be adjusted in accordance with the document set. However, with respect to a threshold value, a configuration may also be adopted in which an average value of an appearance frequency or a probability is calculated for a document group obtained by sampling a document set, and a ratio with respect thereto is automatically determined as a parameter. It is thus possible to avoid performing manual adjustment of each document set.

The word list storage unit 13 stores the word list that is generated by the word extraction unit 12.

With respect to all documents to be analyzed included in the word list stored in the word list storage unit 13, the clustering unit 14 performs clustering based on LDA using words included in the word list stored in the word list storage unit 13. As a result, a probability $p(C;D)$ and a probability $p(W;C)$ are obtained. Note that, although in the present specification the clustering unit 14 is described as a unit for performing clustering based on LDA and calculates $p(C;D)$ and $p(W;C)$ that are probabilities, a configuration may also be adopted in which the clustering unit 14 performs other clustering and acquires, instead of the probability $p(C;D)$, information that shows a degree to which a document D belongs to a cluster C based on a concept included in the document D, and acquires, instead of the probability $p(W;C)$, information that shows a degree to which a word W appears in a cluster C based on a concept thereof. That is, in the present embodiment the probability $p(C;D)$ is used as an example of first information that shows a degree to which a document belongs to each of a plurality of clusters based on a concept included in the document, the probability $p(W;C)$ is used as an example of second information that shows a degree to which a word appears in each of a plurality of clusters based on a concept of the word, and the clustering unit 14 is provided as an example of an acquisition unit for acquiring the first information and the second information.

The first probability storage unit 15 stores probabilities $p(C;D)$ that the clustering unit 14 obtained by performing clustering based on LDA.

The second probability storage unit 16 stores probabilities $p(W;C)$ that the clustering unit 14 obtained by performing clustering based on LDA.

The overlap frequency calculation unit 17 calculates an overlap frequency A that shows a degree of overlap between a concept included in the document D and a concept of the word W using the probabilities $p(C;D)$ stored in the first probability storage unit 15 and the probabilities p(W;C) stored in the second probability storage unit 16. More specifically, the overlap frequency calculation unit 17 calculates the overlap frequency A by means of the equation "A=Σp(C;D)p(W;C) (where Σ denotes a sum total with respect to all Cs)". Note that although in the present specification the overlap frequency calculation unit 17 is described as calculating the overlap frequency A in the form of a numeric value, it is not necessarily the case that the frequency must be calculated in the form of a numeric value, and a configuration may also be adopted in which the overlap frequency calculation unit 17 generates information showing a degree of overlap between a concept included in the document D and a concept of the word W. That is, according to the present embodiment, the overlap frequency A is used as an example of third information that shows the degree of overlap between a concept included in a document and a concept of a word, and the overlap frequency calculation unit 17 is provided as an example of a generation unit for generating the third information.

The overlap frequency comparison unit 18 compares the overlap frequency A that the overlap frequency calculation unit 17 calculated and a predetermined threshold value T. Although the threshold value T may be a predetermined value, the threshold value T may also be determined based on an average value of the overlap frequency A that is calculated with respect to a document group obtained by sampling a document set that is stored in the document set storage unit 11. For example, a case can be considered in which the threshold value T is taken as a value obtained by multiplying an average value of the overlap frequency A calculated for a document group by 0.2. If the overlap frequency A is smaller than the threshold value T, the overlap frequency comparison unit 18 transmits information to that effect to the unique word recording unit 19, and if the overlap frequency A is not smaller than the threshold value T, the overlap frequency comparison unit 18 returns information to that effect to the overlap frequency calculation unit 17. Note that although in the present specification the overlap frequency comparison unit 18 is described as a unit for determining whether or not the overlap frequency A is smaller than the threshold value T that is in the form of a numeric value, it is not necessarily the case that the overlap frequency comparison unit 18 must determine whether or not the overlap frequency A is smaller than a threshold value that is in the form of a numeric value, and overlap frequency comparison unit 18 may also be configured as a unit for determining whether or not information showing a degree of overlap shows a degree of overlap that is lower than a predetermined criterion. That is, in the present embodiment, the threshold value T is used as an example of a predetermined criterion, and the overlap frequency comparison unit 18 is provided as an example of a determination unit for determining whether or not the third information shows a degree of overlap that is lower than the criterion.

Upon information to the effect that the overlap frequency A is lower than the threshold value T being transmitted from the overlap frequency comparison unit 18, the unique word recording unit 19 records the relevant word as being a unique word in the relevant document at that time. According to the present embodiment, the unique word recording unit 19 is provided as an example of an output unit for outputting information to the effect that a word is a unique word in a document.

Note that the above described processing operations are implemented by cooperation between software and hardware resources. More specifically, these processing portions are realized by a CPU 90a (see FIG. 8) reading a program that realizes the functions of the word extraction unit 12, the clustering unit 14, the overlap frequency calculation unit 17, the overlap frequency comparison unit 18, and the unique word recording unit 19 from, for example, a magnetic disk device 90g (see FIG. 8) into a main memory 90c (see FIG. 8) and executing the program. Further, the document set storage unit 11, the word list storage unit 13, the first probability storage unit 15, and the second probability storage unit 16 are, for example, realized by means of the magnetic disk device 90g (see FIG. 8).

Next, operations of the document analysis apparatus 10 in the present embodiment are described.

First, the document analysis apparatus 10 obtains a probability p(C;D) and a probability p(W;C) by performing clustering based on LDA with respect to all documents to be analyzed.

Figure 2:
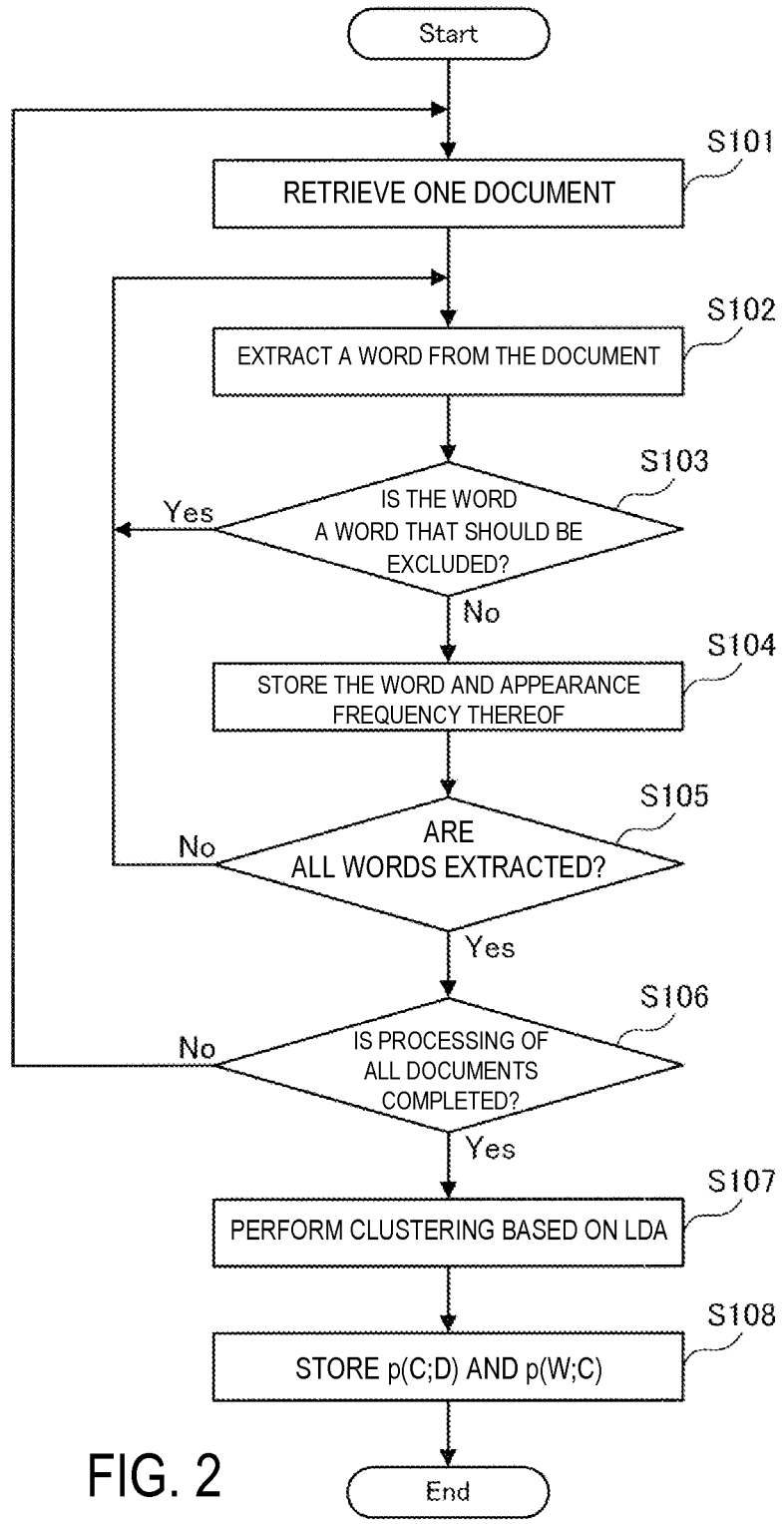
FIG. 2 is a flowchart illustrating an example of operations when storing probabilities that are performed by the document analysis apparatus according to the embodiment of the present invention.

FIG. 2 is a flowchart that illustrates an example of the operations of the document analysis apparatus 10 at this time.

As shown in the figure, in the document analysis apparatus 10, first, the word extraction unit 12 retrieves one document from a document set stored in the document set storage unit 11 (step 101).

Next, the word extraction unit 12 extracts one word from the retrieved document (step 102). The word extraction unit 12 determines whether or not the extracted word is a word that should be excluded (step 103). As one example of the determination at this time, processing is performed to determine the appearance frequency of each word in the document set in advance, and it is then determined whether or not the relevant appearance frequency is higher than a threshold value, or whether or not the appearance frequency is lower than a threshold value. This processing corresponds to the above described first filtering processing. As another example of the determination at this time, processing is performed to determine whether or not the relevant word satisfies a predetermined condition (for example, a condition relating to the word class). This processing corresponds to the above described fourth filtering processing.

If it is determined as a result that the extracted word is a word that should be excluded, the process returns to step 102.

In contrast, if it is determined that the extracted word is not a word that should be excluded, the word extraction unit 12 includes the word and the appearance frequency of the word in a word list that is stored in the word list storage unit 13 (step 104). However, if the word is already included in the word list that is stored in the word list storage unit 13, the appearance frequency thereof is updated by adding 1 to the appearance frequency of the word that is included in the word list.

Thereafter, the word extraction unit 12 determines whether or not all words have been extracted (step 105). If it is determined that all words have not been extracted, the process returns to step 102, while it is determined that all words have been extracted, the process proceeds to step 106.

The word extraction unit 12 then determines whether or not processing of all documents is completed (step 106). If it is determined that processing of all documents is not completed, the process returns to step 101, while if it is determined that processing of all documents is completed, the process proceeds to step 107.

Next, the clustering unit 14 performs clustering based on LDA using the correspondence between each document included in the word list stored in the word list storage unit 13 and words extracted from each document (step 107). The clustering unit 14 stores probabilities p(C;D) and probabilities p(W;C) obtained by the clustering in the first probability storage unit 15 and the second probability storage unit 16, respectively (step 108). However, a configuration may also be adopted so that the probability p(W;C) is not stored if the probability p(W;C) is lower than the threshold value in all clusters. This corresponds to the above described second filtering processing. Further, a configuration may also be adopted so that the probability p(W;C) is not stored if the probability p(W;C) is higher than a threshold value in a plurality of clusters. This corresponds to the above described third filtering processing.

When the probabilities p(C;D) and probabilities p(W;C) are stored in this manner, the document analysis apparatus 10 detects that a word that is being used in a certain document is a unique word in the document.

Figure 3:
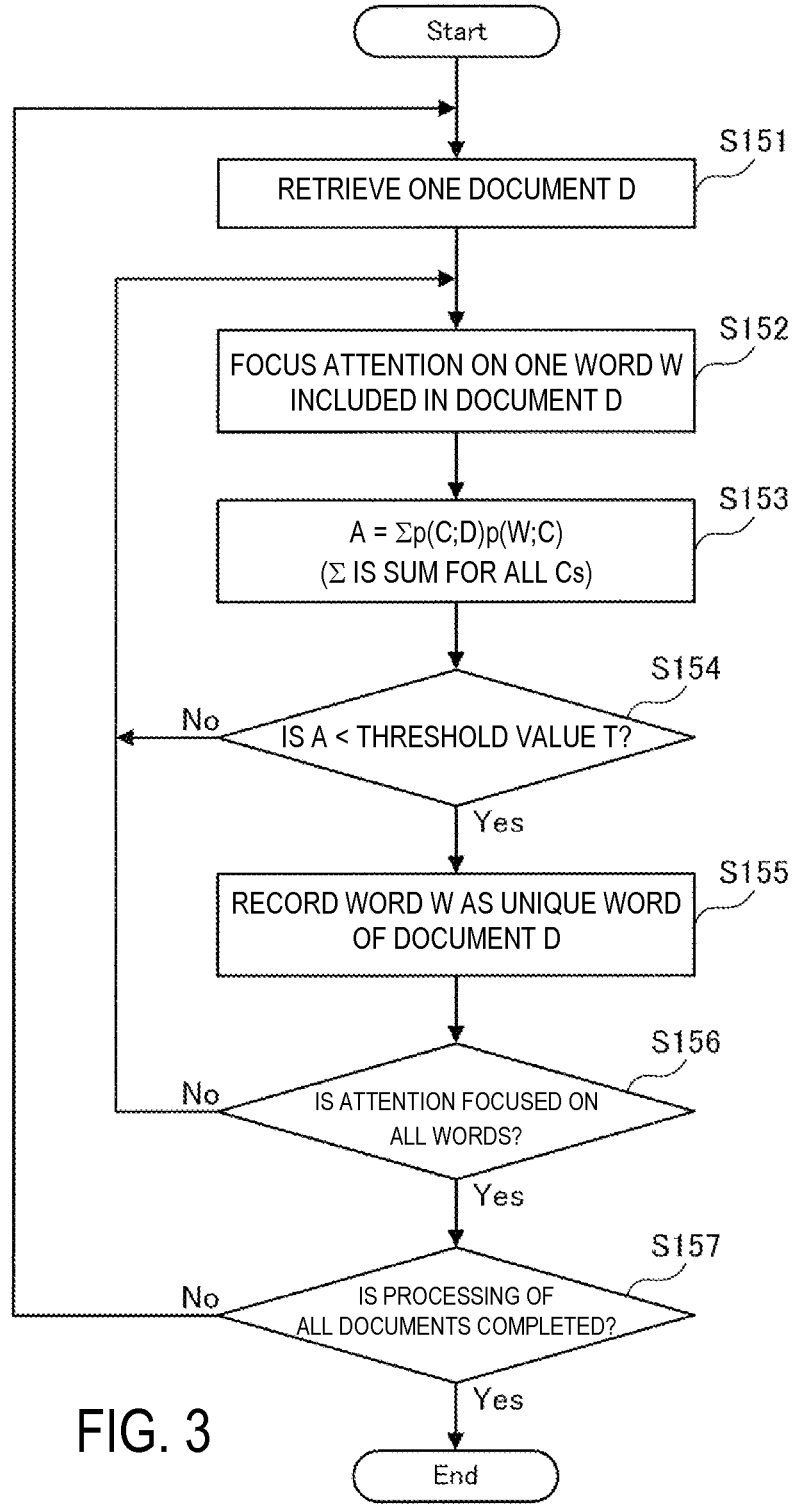
FIG. 3 is a flowchart illustrating an example of operations when detecting a unique word that are performed by the document analysis apparatus according to the embodiment of the present invention.

FIG. 3 is a flowchart illustrating an example of operations performed by the document analysis apparatus 10 at this time.

As shown in the figure, in the document analysis apparatus 10, first, the overlap frequency calculation unit 17 retrieves one document included in the word list stored in the word list storage unit 13 (step 151). The retrieved document is referred to herein as "document D".

Next, the overlap frequency calculation unit 17 focuses attention on one word that is associated with the document D in the word list stored in the word list storage unit 13 (step 152). The word on which attention is focused at this time is referred to herein as "word W". The overlap frequency calculation unit 17 reads out probabilities p(C;D) that the document D belongs to each cluster from the first probability storage unit 15 and also reads out probabilities p(W;C) that the word W appears in each cluster from the second probability storage unit 16, and calculates the overlap frequency A using the equation "A=Σp(C;D)p(W;C) (where Σ denotes a sum total with respect to all Cs)" (step 153).

Thereafter, the overlap frequency comparison unit 18 determines whether or not the overlap frequency A calculated in step 153 is smaller than a predetermined threshold value T (step 154).

If it is determined as a result that the overlap frequency A is not smaller than the threshold value T, since the word W is not a unique word of the document D, the overlap frequency comparison unit 18 returns information to that effect to the overlap frequency calculation unit 17, and the processing of step 152 and thereafter is then performed for the next word.

In contrast, if the overlap frequency comparison unit 18 determines that the overlap frequency A is smaller than the threshold value T, since the word W is a unique word of the document D, the overlap frequency comparison unit 18 transmits information to that effect to the unique word recording unit 19, and the unique word recording unit 19 records the word W as a unique word of the document D (step 155).

Thereafter, information to the effect that the word W was recorded as a unique word of the document D is transmitted to the overlap frequency calculation unit 17 from the unique word recording unit 19, and the overlap frequency calculation unit 17 determines whether or not attention has been focused on all of the words (step 156). If it is determined that attention has not been focused on all of the words, the processing returns to step 152, while if attention has been focused on all of the words, the processing proceeds to step 157.

Next, the overlap frequency calculation unit 17 determines whether or not processing of all documents has been completed (step 157). If the overlap frequency calculation unit 17 determines that processing of all the documents has not been completed, the processing returns to step 151, while if it is determined that processing of all the documents has been completed, the overlap frequency calculation unit 17 ends the processing.

Hereunder, the operations of the document analysis apparatus 10 in the present embodiment are described using a specific example. Note that the term "IBM" that is used as an example of a word and a cluster in the following description, and "IBM" is a registered trademark of the International Business Machines Corporation.

FIG. 4 illustrates an example of documents to be analyzed included in a document set stored in the document set storage unit 11.

In the figure, five documents that are identified by document IDs "Doc1", "Doc2", "Doc3", "Doc4", and "Doc5", respectively, are shown as documents to be analyzed. Note that, hereunder, the documents identified by the document IDs "Doc1", "Doc2", "Doc3", "Doc4", and "Doc5" are described as document Doc1, document Doc2, document Doc3, document Doc4, and document Doc5, respectively. Further, although the documents that are actually assumed as the document Doc1, document Doc2, document Doc3, document Doc4, and document Doc5 are documents that include a plurality of sentences, respectively, in order to simplify the description herein, documents that consist of a single sentence are shown as the document Doc1, document Doc2, document Doc3, document Doc4, and document Doc5, respectively.

FIG. 5 illustrates an example of a word list that is stored in the word list storage unit 13 as a result of executing the processing in steps 101 to 106 in FIG. 2 with respect to the documents to be analyzed shown in FIG. 4.

In this case, it is assumed that a configuration is adopted that extracts nouns as the words from each document, and creates a word list in which the document ID and the extracted words of the respective documents are associated. For example, the word "IBM", the word "large-scale", the word "server" and the word "announcement" are extracted from document Doc1, and these words are associated with the document ID "Doc1". Further, the word "IBM", the word "research", the word "study", the word "results", the word "next-generation", the word "semiconductor", the word "technology" and the word "discloses" are extracted from document Doc2, and these words are associated with the document ID "Doc2".

FIG. 6 illustrates an example of probabilities p(C;D) that are stored in the first probability storage unit 15 in step 108 as a result of executing the processing in step 107 in FIG. 2 with respect to the word list shown in FIG. 5.

In this case, it is assumed that there are two clusters, namely, "IBM" and "agriculture". That is, the probability p(C;D) that the document D belongs in the cluster C is shown for a case where any one of document Doc1, document Doc2, document Doc3, document Doc4 and document Doc5 is taken as the document D, and either of the cluster "IBM" and the cluster "agriculture" is taken as the cluster C.

For example, with respect to document Doc1, document Doc2 and document Doc3, since it was determined that the possibility that the theme of each document is IBM is extremely high, the probability p(C;D) when each of these documents is taken as the document D and the cluster "IBM" is taken as the cluster C is "1.0". In addition, with respect to document Doc4 and document Doc5, since it was determined that the possibility that the theme of each document is IBM is lower than for document Doc1, document Doc2 and document Doc3, the probability p(C;D) when each of these documents is taken as the document D and the cluster "IBM" is taken as the cluster C is "0.7" and "0.9", respectively.

Further, since it was determined that the possibility that the theme of each of document Doc1, document Doc2 and document Doc3 is agriculture is extremely low, the probability p(C;D) when each of these documents is taken as the document D and the cluster "agriculture" is taken as the cluster C is "0.0". In contrast, since it was determined that the possibility that the theme of each of document Doc4 and document Doc5 is agriculture is higher than for document Doc1, document Doc2 and document Doc3, the probability p(C;D) when each of these documents is taken as the document D and the cluster "agriculture" is taken as the cluster C is "0.3" and "0.1", respectively.

FIG. 7 illustrates an example of probabilities p(W;C) that are stored in the second probability storage unit 16 in step 108 as a result of executing the processing in step 107 in FIG. 2 with respect to the word list shown in FIG. 5.

In this case also, it is assumed that there are two clusters, namely, "IBM" and "agriculture". That is, the probability p(W;C) of the word W appearing in the cluster C is shown for a case where any of the words included in the word list shown in FIG. 5 is taken as the word W, and either of the cluster "IBM" and the cluster "agriculture" is taken as the cluster C. Note that, however, among the words included in the word list, only words that are required for the following description are shown in the figure, and words other than those words are omitted.

For example, since it was determined that the possibility that the word "IBM", the word "server", the word "semiconductor", the word "database" and the word "IT" relate to IBM is extremely high, the probability p(W;C) when any one of these words is taken as the word W and the cluster "IBM" is taken as the cluster C is "1.0". Further, since it was determined that the possibility that the word "accounts" is a word that relates to IBM is lower than for the foregoing words, the probability p(W;C) when the word "accounts" is taken as the word W and the cluster "IBM" is taken as the cluster C is "0.8". In contrast, since it was determined that the possibility that the word "agriculture" is a word that relates to IBM is extremely low, the probability p(W;C) when the word "agriculture" is taken as the word W and the cluster "IBM" is taken as the cluster C is "0.0".

Further, since it was determined that the possibility that the word "agriculture" is a word that relates to agriculture is extremely high, the probability p(W;C) when the word "agriculture" is taken as the word W and the cluster "agriculture" is taken as the cluster C is "1.0", while, on the other hand, since it is determined that the possibility that the word "accounts" is a word that relates to agriculture is lower than the aforementioned probability, the probability p(W;C) when the word "accounts" is taken as the word W and the cluster "agriculture" is taken as the cluster C is "0.2". In contrast, since it was determined that the possibility that the word "IBM", the word "server", the word "semiconductor", the word "database" and the word "IT" are words that relate to agriculture is extremely low, the probability p(W;C) when any one of these words is taken as the word W and the cluster "agriculture" is taken as the cluster C is "0.0".

Thereafter, the overlap frequency A is calculated by executing the processing in steps 151 to 153 in FIG. 3.

First, a case will be considered where the document Doc1 is taken as the document D and either one of the word "IBM" and the word "server" is taken as the word W. In this case, the probability p(C;D) and the probability p(W;C) with respect to the cluster "IBM" are each "1.0", and the probability p(C;D) and the probability p(W;C) with respect to the cluster "agriculture" are each "0.0", and therefore the overlap frequency A is "1.0 (=1.0×1.0+0.0×0.0)".

Further, a case will be considered where the document Doc2 is taken as the document D and either one of the word "IBM" and the word "semiconductor" is taken as the word W. In this case, the probability p(C;D) and the probability p(W;C) with respect to the cluster "IBM" are each "1.0", and the probability p(C;D) and the probability p(W;C) with respect to the cluster "agriculture" are each "0.0", and therefore the overlap frequency A is "1.0 (=1.0×1.0+0.0×0.0)".

In addition, a case will be considered where the document Doc3 is taken as the document D and either one of the word "IBM" and the word "database" is taken as the word W. In this case, the probability p(C;D) and the probability p(W;C) with respect to the cluster "IBM" are each "1.0", and the probability p(C;D) and the probability p(W;C) with respect to the cluster "agriculture" are each "0.0", and therefore the overlap frequency A is "1.0 (=1.0×1.0+0.0×0.0)".

Next, a case will be considered where the document Doc4 is taken as the document D, and the word "IBM" is taken as the word W. In this case, the probability p(C;D) and the probability p(W;C) with respect to the cluster "IBM" are "0.7" and "1.0", respectively, and the probability p(C;D) and the probability p(W;C) with respect to the cluster "agriculture" are "0.3" and "0.0", respectively, and therefore the overlap frequency A is "0.7 (=0.7×1.0+0.3×0.0)".

In contrast, a case will now be considered where the document Doc4 is taken as the document D, and the word "agriculture" is taken as the word W. In this case, the probability p(C;D) and the probability p(W;C) with respect to the cluster "IBM" are "0.7" and "0.0", respectively, and the probability p(C;D) and the probability p(W;C) with respect to the cluster "agriculture" are "0.3" and "1.0", respectively, and therefore the overlap frequency A is "0.3 (=0.7×0.0+0.3×1.0)".

Next, a case will be considered where the document Doc5 is taken as the document D, and the word "IBM" is taken as the word W. In this case, the probability p(C;D) and the probability p(W;C) with respect to the cluster "IBM" are "0.9" and "1.0", respectively, and the probability p(C;D) and the probability p(W;C) with respect to the cluster "agriculture" are "0.1" and "0.0", respectively, and therefore the overlap frequency A is "0.9 (=0.9×1.0+0.1×0.0)".

Further, a case will be considered where the document Doc5 is taken as the document D, and the word "accounts" is taken as the word W. In this case, the probability p(C;D) and the probability p(W;C) with respect to the cluster "IBM" are "0.9" and "0.8", respectively, and the probability p(C;D) and the probability p(W;C) with respect to the cluster "agriculture" are "0.1" and "0.2", respectively, and therefore the overlap frequency A is "0.74 (=0.9×0.8+0.1×0.2)".

When the overlap frequency A is calculated in this manner, a unique word is recorded by execution of steps 154 to 155 in FIG. 3.

Assume that the threshold value T is "0.4" in the above described example. In this case, the overlap frequency A is lower than the threshold value T only in the case where the document Doc4 is taken as the document D and the word "agriculture" is taken as the word W. Hence, the word "agriculture" is recorded as a unique word of the document Doc4.

As described above, according to the present embodiment a probability p(C;D) that the document D belongs to the cluster C and a probability p(W;C) that the word W appears in the cluster C are acquired by performing clustering based on LDA with respect to all documents to be analyzed, the overlap frequency A that shows the level of overlap between a concept included in the document D and a concept of the word W is calculated based on these probabilities, and if the overlap frequency A is smaller than the threshold value T, the word W is recorded as a unique word of the document D. As a result, it is possible to find that a word W that is unique in the document D is being used in the document D.

Note that, although according to the present embodiment a configuration is adopted so as to acquire the probability p(C;D) and the probability p(W;C) by performing clustering with respect to all of the documents to be analyzed, the present invention is not limited thereto. That is, a configuration may also be adopted so as to acquire information that is equivalent to the probability p(C;D) and the probability p(W;C) by another method without performing clustering.

A preferable computer hardware configuration to which the present embodiment is applicable will now be described.

Figure 8:
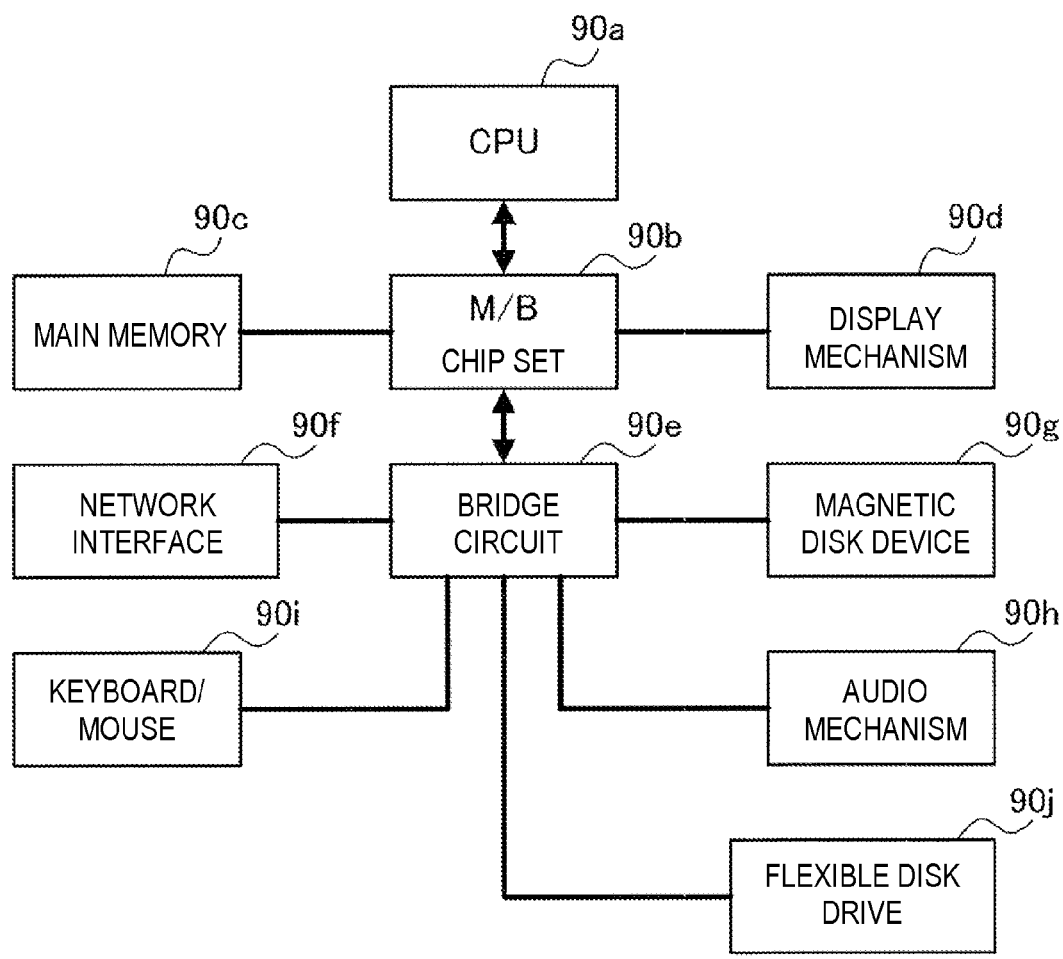
FIG. 8 is a diagram illustrating an example of a computer hardware configuration to which the embodiment of the present invention is applicable.

FIG. 8 is a diagram that illustrates an example of such a computer hardware configuration. As shown in the figure, the computer includes a CPU (central processing unit) $90a$ as computation means, a main memory $90c$ that is connected to the CPU $90a$ via an M/B (motherboard) chip set $90b$, and a display mechanism $90d$ that is similarly connected to the CPU $90a$ via the M/B chip set $90b$. Further, a network interface $90f$, a magnetic disk device (HDD) $90g$, an audio mechanism $90h$, a keyboard/mouse $90i$, and a flexible disk drive $90j$ are connected to the M/B chip set $90b$ via a bridge circuit $90e$.

In FIG. 8, the respective components are connected to one another via buses. For example, the CPU $90a$ and the M/B chip set $90b$, and the M/B chip set $90b$ and the main memory $90c$ are connected via a CPU bus. Further, although the M/B chip set $90b$ and the display mechanism $90d$ may be connected via an AGP (accelerated graphics port), if the display mechanism $90d$ includes a video card that supports PCI Express, the M/B chip set $90b$ and the aforementioned video card are connected via a PCI Express (PCIe) bus. The bridge circuit $90e$ and the network interface $90f$ can be connected, for example, using a PCI Express bus. Further, the bridge circuit $90e$ and the magnetic disk device $90g$ can be connected, for example, using a serial ATA (AT attachment) bus, a parallel transfer ATA bus, or a PCI (peripheral component interconnect) bus. In addition, the bridge circuit $90e$ and the keyboard/mouse $90i$, and the bridge circuit $90e$ and the flexible disk drive $90j$ can be connected using a USB (universal serial bus).

However, demands with respect to such technologies include a desire to find documents in which common terms are used in an unexpected context. For example, assume that, with regard to automobile-related news, the term "electric vehicle" frequently appears in news stories, and the place name "country A" also often appears in the news, but heretofore there has not been a news story that reports that an "electric vehicle" is to go on sale in "country A". In this case, since a document in which a combination of the terms "electric vehicle" and "country A" appears has a high value as news, the demand concerns a desire to automatically detect this combination of terms.

To meet this demand, it is necessary to not only find unique documents, but also to find that a word is being used in a certain document that is unique in the document.

In this connection, although the technologies disclosed in known prior art include technology that finds a unique document, those technologies do not include technology that finds that a word is being used in a certain document that is unique in the document.

An object of the present invention is to find that a word is being used in a certain document that is unique in the document. To achieve the aforementioned object, the present invention provides an apparatus for supporting acquisition of information from a document including a plurality of words, the apparatus including: an acquisition unit for acquiring first information that shows a degree to which the document belongs to each of a plurality of clusters based on a concept included in the document, and second information that shows a degree to which a single word among the plurality of words appears in each of the plurality of clusters based on a concept of the single word; a generation unit for, based on the first information and the second information, generating third information that shows a degree of overlap between the concept included in the document and the concept of the single word; a determination unit for determining whether or not the third information shows a degree of overlap that is lower than a predetermined criterion; and an output unit for, when it is determined that the third information shows a degree of overlap that is lower than the criterion, outputting information indicating that the single word is a unique word in the document.

In this case, a configuration may also be adopted in which the acquisition unit acquires the first information and the second information by performing clustering with respect to a plurality of documents that include the document.

Further, a configuration may be adopted in which the apparatus further includes an extraction unit for extracting words from each document of the plurality of documents, in which, with respect to the plurality of documents, by performing clustering based on LDA (latent Dirichlet allocation) using words extracted from each document, the acquisition unit acquires a first probability that is a probability that the document belongs to the plurality of clusters, respectively, as the first information, and acquires a second probability that is a probability that the single word belongs to the plurality of clusters, respectively, as the second information.

A configuration may be adopted in which by calculating a sum total of products of the first probability with respect to a single cluster among the plurality of clusters and the second probability with respect to the single cluster for all clusters of the plurality of clusters, the generation unit generates the sum total as the third information.

Furthermore, a configuration may be adopted in which the determination unit determines whether or not the sum total is smaller than a predetermined threshold value that is the criterion, and if it is determined that the sum total is smaller than the threshold value, the output unit outputs information indicating that the single word is a unique word in the document.

In addition, the present invention provides a method for supporting acquisition of information from a document including a plurality of words, the method including: a step of acquiring first information that shows a degree to which the document belongs to each of a plurality of clusters based on a concept included in the document, and second information that shows a degree to which a single word among the plurality of words appears in each of the plurality of clusters based on a concept of the single word; a step of generating third information that shows a degree of overlap between the concept included in the document and the concept of the single word, based on the first information and the second information; a step of determining whether or not the third information shows a degree of overlap that is lower than a predetermined criterion; and a step of outputting information indicating that the single word is a unique word in the document when it is determined that the third information shows a degree of overlap that is lower than the criterion.

Further, the present invention provides a program causing a computer to function as an apparatus for supporting acquisition of information from a document that includes a plurality of words, in which the program causes the computer to function as: an acquisition unit for acquiring first information that shows a degree to which the document belongs to each of a plurality of clusters based on a concept included in the document, and second information that shows a degree to which a single word among the plurality of words appears in each of the plurality of clusters based on a concept of the single word; a generation unit for, based on the first information and the second information, generating third information that shows a degree of overlap between the concept included in the document and the concept of the single word; a determination unit for determining whether or not the third information shows a degree of overlap that is lower than a predetermined criterion; and an output unit for, when it is determined that the third information shows a degree of overlap that is lower than the criterion, outputting information indicating that the single word is a unique word in the document.

According to the present invention, it is possible to find that a word is being used in a certain document that is unique in the document.

As described herein, one or more embodiments of the present invention enable the finding of that a word that is being used in a certain document and that is unique in the document. In order to achieve this solution, solving means in one embodiment comprise a document analysis apparatus 10, a word extraction unit 12 generates a word list by extracting words from documents to be analyzed. Next, with respect to all of the documents to be analyzed, a clustering unit 14 performs clustering based on LDA using the word list, and acquires a probability p(C;D) that a document D belongs to a cluster C and a probability p(W;C) that a word W appears in the cluster C. Thereafter, an overlap frequency calculation unit 17 calculates an overlap frequency A by adding together the products of the probability p(C;D) and the probability P(W;C) for all clusters, an overlap frequency comparison unit 18 determines whether or not the overlap frequency A is smaller than a threshold value T, and if is determined that the overlap frequency A is smaller than the threshold value T, a unique word recording unit 19 records the word W as a unique word of the document D.

Note that the present invention can take the form of an entirely hardware implementation, an entirely software implementation, or an implementation containing both hardware and software elements. Further, the present invention can be implemented as a computer, a data processing system, or a computer program. Such a computer program can be provided in a form in which the computer program is stored on a computer-readable medium. The medium can be an electronic, magnetic, optical, electromagnetic, infrared or semiconductor system (apparatus or device) or a propagation medium. Examples of the computer-readable medium include a semiconductor, a solid-state storage device, a magnetic tape, a removable computer diskette, a random access memory (RAM), a read-only memory (ROM), a rigid magnetic disk, and an optical disk. Current examples of optical disks include a compact disk read-only memory (CD-ROM), a compact disk-read/write (CD-R/W), and a digital versatile disk (DVD).

While the present invention has been described above using the foregoing embodiment, the technical scope of the present invention is not limited to that of the above described embodiment. It will be apparent to those skilled in the art that various changes and substitutions can be made without departing from spirit and scope of the present invention.

What is claimed is:

1. An apparatus for supporting acquisition of information from a document including a plurality of words, the apparatus comprising:
    an acquisition hardware unit for acquiring first information that shows a degree to which the document belongs to each of a plurality of clusters based on a concept included in the document, and second information that shows a degree to which a single word among the plurality of words appears in each of the plurality of clusters based on a concept of the single word;
    a generation hardware unit for, based on the first information and the second information, generating third information that shows a degree of overlap between the concept included in the document and the concept of the single word;
    a determination hardware unit for determining whether or not the third information shows a degree of overlap that is lower than a predetermined criterion;
    an output hardware unit for, in response to determining that the third information shows the degree of overlap is lower than the predetermined criterion, outputting information indicating that the single word is a unique word in the document, wherein the unique word is a word that is found only in the document that belongs to one or more of the plurality of clusters, and wherein the document is a single document;
    at least one processor for retrieving the document that contains the unique word; and
    an extraction hardware unit for extracting words from each document of the plurality of documents, wherein, with respect to the plurality of documents, by performing clustering using words extracted from each document, the acquisition hardware unit acquires a first probability that is a probability that the document belongs to the plurality of clusters, respectively, as the first information, and acquires a second probability that is a probability that the single word belongs to the plurality of clusters, respectively, as the second information; wherein by calculating a sum total of products of the first probability with respect to a single cluster among the plurality of clusters and the second probability with respect to the single cluster for all clusters of the plurality of clusters, the generation hardware unit generates the sum total as the third information.

2. The apparatus according to claim 1, wherein the acquisition hardware unit acquires the first information and the second information by performing clustering with respect to a plurality of documents that include the document.

3. The apparatus according to claim 1, wherein:
    the determination unit determines whether or not the sum total is smaller than a predetermined threshold value that is the predetermined criterion; and
    in response to the determination unit determining that the sum total is smaller than the threshold value, the output unit outputs information indicating that the single word is the unique word in the document.

4. A method for supporting acquisition of information from a document including a plurality of words, the method comprising:

acquiring, by one or more processors, first information that shows a degree to which the document belongs to each of a plurality of clusters based on a concept included in the document, and second information that shows a degree to which a single word among the plurality of words appears in each of the plurality of clusters based on a concept of the single word;

generating, by one or more processors, third information that shows a degree of overlap between the concept included in the document and the concept of the single word, based on the first information and the second information;

determining, by one or more processors, whether or not the third information shows a degree of overlap that is lower than a predetermined criterion;

outputting, by one or more processors, information indicating that the single word is a unique word in the document in response to determining that the third information shows the degree of overlap is lower than the predetermined criterion, wherein the unique word is a word that is found only in the document that belongs to one or more of the plurality of clusters, and wherein the document is a single document;

retrieving, by one or more processors, the document that contains the unique word;

extracting, by one or more processors, words from each document of the plurality of documents, wherein, with respect to the plurality of documents, by performing clustering using words extracted from each document, acquiring a first probability that is a probability that the document belongs to the plurality of clusters, respectively, as the first information, and acquiring a second probability that is a probability that the single word belongs to the plurality of clusters, respectively, as the second information;

calculating, by one or more processors, a sum total of products of the first probability with respect to a single cluster among the plurality of clusters and the second probability with respect to the single cluster for all clusters of the plurality of clusters; and generating, by one or more processors, the sum total as the third information.

5. The method of claim 4, further comprising:
acquiring, by one or more processors, the first information and the second information by performing clustering with respect to a plurality of documents that include the document.

6. The method of claim 4, further comprising:
determining, by one or more processors, whether or not the sum total is smaller than a predetermined threshold value that is the predetermined criterion; and
in response to determining that the sum total is smaller than the threshold value, outputting, by one or more processors, information indicating that the single word is the unique word in the document.

7. A computer program product for supporting acquisition of information from a document including a plurality of words, the computer program product comprising a computer readable storage medium having program code embodied therewith, the program code readable and executable by a processor to the method comprising:

acquiring first information that shows a degree to which the document belongs to each of a plurality of clusters based on a concept included in the document, and second information that shows a degree to which a single word among the plurality of words appears in each of the plurality of clusters based on a concept of the single word;

generating third information that shows a degree of overlap between the concept included in the document and the concept of the single word, based on the first information and the second information;

determining whether or not the third information shows a degree of overlap that is lower than a predetermined criterion;

outputting information indicating that the single word is a unique word in the document in response to determining that the third information shows the degree of overlap is lower than the predetermined criterion, wherein the unique word is a word that is found only in the document that belongs to one or more of the plurality of clusters, and wherein the document is a single document;

retrieving the document that contains the unique word;

extracting words from each document of the plurality of documents, wherein, with respect to the plurality of documents, by performing clustering using words extracted from each document, acquiring a first probability that is a probability that the document belongs to the plurality of clusters, respectively, as the first information, and acquiring a second probability that is a probability that the single word belongs to the plurality of clusters, respectively, as the second information;

calculating a sum total of products of the first probability with respect to a single cluster among the plurality of clusters and the second probability with respect to the single cluster for all clusters of the plurality of clusters; and generating the sum total as the third information.

8. The computer program product of claim 7, wherein the method further comprises:
acquiring the first information and the second information by performing clustering with respect to a plurality of documents that include the document.

9. The computer program product of claim 7, wherein the method further comprises:
determining whether or not the sum total is smaller than a predetermined threshold value that is the predetermined criterion; and
in response to determining that the sum total is smaller than the threshold value, outputting information indicating that the single word is the unique word in the document.

* * * * *